(12) United States Patent  (10) Patent No.: US 9,849,553 B2
Bialy et al.  (45) Date of Patent: Dec. 26, 2017

(54) DRILLING SAFETY SYSTEM (71) Applicants: Christopher R. Bialy, Oakland, NJ (US); Richard C. Vroman, Jr., Randolph, NJ (US)

(72) Inventors: Christopher R. Bialy, Oakland, NJ (US); Richard C. Vroman, Jr., Randolph, NJ (US)

( * ) Notice: Subject to any disclaimer, the term of this patent is extended or adjusted under 35 U.S.C. 154(b) by 0 days.

(21) Appl. No.: 14/201,981

(22) Filed: Mar. 10, 2014

(65) Prior Publication Data
US 2014/0271004 A1  Sep. 18, 2014

Related U.S. Application Data (60) Provisional application No. 61/777,635, filed on Mar. 12, 2013.

(51) Int. Cl.
*B23Q 11/00* (2006.01)
*B23B 47/34* (2006.01)
*B23B 51/04* (2006.01)

(52) U.S. Cl.
CPC .......... *B23Q 11/0064* (2013.01); *B23B 47/34* (2013.01); *B23Q 11/0046* (2013.01);
(Continued)

(58) Field of Classification Search
CPC . B23B 47/287; B23B 49/026; B23B 51/0406; B23B 2247/12; B23B 47/28; B23B 47/34; B23Q 11/0046; B23Q 11/0064; B23Q 11/0067; B23Q 3/1546; Y10T 408/50; Y10T 408/554; Y10T 408/56245; Y10T 408/8957; Y10T 408/8925; Y10T 408/569; Y10T 408/99; Y10T 408/895
See application file for complete search history.

(56) References Cited

U.S. PATENT DOCUMENTS 710,257 A * 9/1902 De Leeuw ........... B25H 1/0071
 147/5
1,234,468 A * 7/1917 Hamilton ............ B23B 51/0426
 408/112

(Continued)

OTHER PUBLICATIONS www.drillmagnet.com/about_drillmagnet.html (Jan. 8, 2013).

*Primary Examiner* — Eric A Gates
*Assistant Examiner* — Donte Brown
(74) *Attorney, Agent, or Firm* — Gearhart Law LLC (57) ABSTRACT The present disclosure describes and teaches a drill safety system including a magnetic unit, a vacuum unit, and an improved hole saw drill set. The various parts of the drill safety system may be used individually or in combination with one another. The user may use the magnetic unit to surround the drilling site so that metal drill shavings on the drill surface may be collected by the magnetic unit. In addition, the magnetic unit includes a flippable top mechanism, allowing convenient disposal of the debris. The vacuum unit is fitted to the inner surface of the drilling site, collecting debris that fall through. The improved hole saw prevents over-penetrating by the drill, reducing the likelihood of damaging equipments underneath the drill site. This makes the drill particularly suitable for drilling holes during electrical work.

15 Claims, 6 Drawing Sheets (52) U.S. Cl.
CPC ......... *B23B 51/0406* (2013.01); *Y10T 408/50* (2015.01); *Y10T 408/554* (2015.01); *Y10T 408/895* (2015.01)

(56) References Cited

U.S. PATENT DOCUMENTS

| | | | | |
|---|---|---|---|---|
| 1,281,627 A * | 10/1918 | Misener | B23B 51/0426 | 279/16 |
| 1,855,873 A * | 4/1932 | Shortell | B23B 51/0473 | 408/206 |
| 2,140,192 A * | 12/1938 | Thatcher | B23B 51/0473 | 408/206 |
| 2,179,029 A * | 11/1939 | Barnes | B23B 51/0426 | 30/347 |
| 2,444,099 A * | 6/1948 | Hennessey, Jr. | B23B 51/0426 | 144/23 |
| 2,548,314 A * | 4/1951 | Kinney, Sr. | B23Q 11/0064 | 269/8 |
| 2,564,451 A * | 8/1951 | Sandberg | B26D 1/445 | 408/206 |
| 2,818,655 A * | 1/1958 | De Gaston | B23Q 3/1543 | 248/362 |
| 2,861,484 A * | 11/1958 | Rance | B23B 49/026 | 359/813 |
| 2,951,586 A * | 9/1960 | Moriya | B03C 1/0332 | 210/223 |
| 3,477,481 A * | 11/1969 | Czerniewicz | B23B 49/005 | 144/144.1 |
| 3,825,362 A * | 7/1974 | Hougen | B23B 51/044 | 408/204 |
| 4,063,478 A * | 12/1977 | Stuy | B23D 59/006 | 144/252.1 |
| 4,303,357 A * | 12/1981 | Makar | B23B 31/113 | 279/145 |
| 4,669,928 A * | 6/1987 | Mediavilla | B23B 51/044 | 408/204 |
| 4,754,882 A | 7/1988 | Petitpierre | | |
| 4,813,462 A * | 3/1989 | Linn | B23Q 11/0046 | 141/65 |
| 4,978,255 A * | 12/1990 | Gale | F16L 41/04 | 137/15.12 |
| 5,034,041 A * | 7/1991 | Austin | B23Q 11/0046 | 144/252.1 |
| 5,035,550 A * | 7/1991 | Ajimi | B23B 51/0426 | 408/204 |
| 5,052,411 A * | 10/1991 | Schoolman | A61B 19/38 | 128/847 |
| 5,069,695 A * | 12/1991 | Austin | B23Q 11/0046 | 144/252.1 |
| 5,481,983 A | 1/1996 | Guzman et al. | | |
| 5,522,683 A * | 6/1996 | Kakimoto | B23B 41/00 | 408/13 |
| 5,549,207 A | 8/1996 | Busico et al. | | |
| 5,905,425 A | 5/1999 | Dalby et al. | | |
| 5,915,893 A * | 6/1999 | Miyanaga | B23B 51/009 | 408/202 |
| 6,036,412 A * | 3/2000 | Dalla | B23Q 11/0046 | 408/56 |
| 6,154,919 A * | 12/2000 | Hetko | A47L 7/0047 | 15/339 |
| 6,341,925 B1 * | 1/2002 | Despres | B23B 51/0453 | 408/204 |
| 6,464,083 B1 | 10/2002 | Harrison et al. | | |
| 6,547,649 B1 | 4/2003 | Andrus | | |
| 6,641,338 B2 * | 11/2003 | Despres | B23B 51/0453 | 408/204 |
| 6,663,825 B2 * | 12/2003 | Grant, Jr. | C21C 5/445 | 266/135 |
| 6,805,794 B2 * | 10/2004 | Hirabayashi | B03C 1/12 | 209/232 |
| 6,893,194 B2 * | 5/2005 | Jones | B23B 51/0426 | 408/1 R |
| 6,948,574 B2 * | 9/2005 | Cramer | B24B 1/04 | 175/403 |
| 6,974,048 B2 * | 12/2005 | Funk | B23Q 11/0064 | 206/818 |
| 7,073,992 B2 * | 7/2006 | Korb | B23B 31/008 | 408/204 |
| 7,102,476 B1 * | 9/2006 | Shen | B23Q 3/1546 | 269/8 |
| 7,148,782 B2 * | 12/2006 | Hirzel | H01F 27/25 | 310/208 |
| 7,320,179 B2 * | 1/2008 | Tiemann | B23B 49/005 | 29/428 |
| 7,384,222 B2 * | 6/2008 | Chao | B23B 31/1075 | 408/204 |
| 7,396,193 B2 * | 7/2008 | Kesten | B23Q 11/0046 | 408/67 |
| 7,648,315 B2 * | 1/2010 | Omi | B23B 31/1071 | 279/71 |
| 7,676,882 B1 * | 3/2010 | Safiol | A47L 13/52 | 15/257.1 |
| 7,905,260 B2 * | 3/2011 | Keenan | B23Q 11/0046 | 144/252.1 |
| 7,938,600 B1 * | 5/2011 | Griep | B23B 51/044 | 408/1 R |
| 8,016,522 B2 * | 9/2011 | Chen | B23B 49/026 | 408/115 R |
| 8,079,389 B2 * | 12/2011 | Shepherd | B23Q 11/0046 | 144/252.1 |
| 8,100,612 B2 * | 1/2012 | Miyanaga | B23B 51/0426 | 408/204 |
| 8,210,782 B2 * | 7/2012 | Kai | B23C 1/06 | 29/27 R |
| 8,235,773 B2 * | 8/2012 | Yin | B23Q 11/0046 | 451/451 |
| 8,308,621 B2 * | 11/2012 | Shih | B23Q 3/15706 | 409/136 |
| 8,534,967 B2 * | 9/2013 | Miyamoto | B23Q 11/0046 | 408/11 |
| 8,662,801 B2 * | 3/2014 | Santamarina | B23B 49/005 | 408/110 |
| 8,974,358 B2 * | 3/2015 | Shih | B23Q 11/0067 | 279/43.8 |
| 2005/0047880 A1 * | 3/2005 | Seely | B23Q 11/0053 | 408/67 |
| 2008/0014035 A1 * | 1/2008 | Perkovich | B23B 47/281 | 408/1 R |
| 2008/0273934 A1 * | 11/2008 | Morgan | B23B 51/0426 | 408/206 |
| 2010/0005618 A1 * | 1/2010 | Minemura | B08B 1/008 | 15/347 |
| 2010/0024618 A1 * | 2/2010 | Minemura | B23Q 11/0046 | 83/168 |
| 2010/0050365 A1 * | 3/2010 | Inoue | B23Q 11/0046 | 15/300.1 |
| 2010/0078362 A1 | 4/2010 | Riise et al. | | |
| 2010/0189524 A1 * | 7/2010 | Yin | B23Q 11/0046 | 409/137 |
| 2011/0274508 A1 * | 11/2011 | Russell | B23B 49/026 | 408/67 |
| 2012/0260458 A1 * | 10/2012 | King, Jr. | A47L 7/0095 | 15/415.1 |
| 2013/0198996 A1 * | 8/2013 | King, Jr. | A47L 9/02 | 15/415.1 |

* cited by examiner

DRILLING SAFETY SYSTEM

CLAIM OF PRIORITY

This application claims the priority of U.S. Ser. No. 61/777,635 filed on Mar. 12, 2013, the contents of which are fully incorporated herein by reference.

FIELD OF THE INVENTION

The invention relates to a drilling safety system and more particularly relates to a safety system specially designed to prevent drill shaving and debris from damaging the surrounding equipments and harming the worker.

BACKGROUND OF THE INVENTION

For many manufacturing, maintenance, and repair projects, drilling is an indispensible part of the operation. Under some circumstances, drilling can become hazardous to the person conducting the drilling, the workpiece, and/or the equipments and environment surrounding the drilling site. If essential safety devices cannot be provided, or if proper safety procedures cannot be followed, accidents during drilling may happen, causing significant damages and threatening the worker's wellbeing.

One example for hazardous drilling operations is drilling conducted during electrical work. The electricians are sometimes required to drill on the metal housing of switchgears, which in many instances have to stay "live"—with the electricity still on during the drilling process. Such requirements are not rare, especially for the maintenance and repair work conducted for companies, factories and hospitals, where the continuous provision of electricity is essential. However, the metal shavings and debris resulted from drilling are very hard to collect and such shavings and debris may disperse into the live switchgear, causing short-circuiting or even explosion. Most electricians use make-shift arrangements to collect the shavings and debris. For example, one worker may reach inside the housing of live gear and hold a cardboard box under the drill site while another worker drills through the top. However, such temporary solutions are far from complete and fully effective.

Some devices and systems have been developed to address the danger associated with drilling debris. These designs, however, show shortcomings in one aspect or another. For example, U.S. Pat. No. 6,974,048 ('048 patent) discloses a safety tool that includes magnets and an outer non-conductive sheath encompassing an inner bag. A purpose of the tool is to provide safety for the operator while drilling or cutting into electrical/electronic enclosures, such as switchgear. The tool is constructed so that an operator can perform a task while preventing any conductive debris caused by this task to come in contact with any electrical parts. The top portion of the tool magnetically attaches to the inside of the switchgear structure. The bottom portion of the tool, which is coupled to the top portion by the non-conductive sheath, collects and magnetically contains the debris, such as shavings from drilling into the structure. The debris is collected in the inner bag, which can easily be removed from the tool for disposal of the debris.

This design of the '048 patent, however, has at least two significant disadvantages. First, while much all of the debris is generated on the drilling surface where drilling is initiated, such debris is not properly collected. It should be noted that the majority of the shavings stay at the drilling side and the design taught by the '048 patent does not address these shavings at all. The device disclosed by the '048 patent only collects the shavings after the drill bit has penetrated the workpiece. The shavings on the side of the drill are not collected and these shavings have the potential to cause significant damage to the surrounding equipment as well as the worker himself/herself. More importantly, the tool disclosed by the '048 patent requires the worker to place his/her arm into the housing of live gear to attach the tool to the inner surface of the housing. Similar action is also required to remove the tool from inside the housing of live gear. Such attachment/removal processes significantly increase the chance that the worker would be electrocuted, accidentally drop the bag full of shavings/slugs into the gear, or come in contact with energized parts while holding the bag full of shavings. Therefore, the design by the '048 patent is both unreliable and unsafe.

The hazards of drilling into live electrical equipment involve at least (1) the danger of metal shavings and the slug created by the hole saw entering the housing of the gear during the drilling process and after the drilling process is completed from the drilling side; (2) the danger of the hole saw being released from the drill chuck during the drilling process and falling into the live equipment; (3) the danger of a worker reaching into the live equipment to place equipment inside the housing of live gear under the drilling area to catch debris and removing it, and (4) the danger of dropping the conductive metal shavings accidentally inside the housing of live gear once such shavings are collected.

The current invention addresses all the concerns herein discussed and properly collects all the shavings generated in a drilling process without requiring a worker to reach inside the house of live gear. The devices taught by the current invention may be used in various types of drilling operations and are particularly useful for drilling conducted during electrical work. In summary, various implements are known in the art, but fail to address all of the problems solved by the invention described herein. The preferred embodiments of this invention are illustrated in the accompanying drawings and will be described in more detail herein below.

SUMMARY OF THE INVENTION

The present invention discloses a drill safety system, which may include three parts that can be used individually or in combination. The three parts include: a magnetic unit, a vacuum unit, and an improved hole saw drill set. The magnetic unit may comprise a magnet core and a flexible and openable cover shielding the magnetic core. The vacuum unit may comprise a collecting cup and a connecting tube, wherein the collecting cup and the connecting tube are hollow inside and are connected. The key feature of the hole saw drill set is that it has stopper flange extending from the front periphery of the hole saw arbor, wherein the stopper flange is positioned right behind and abutting the hole saw and blocks advancement of the drill set when the stopper flange abuts a workpiece.

As indicated above, the three parts of the drill safety system may be used individually. However, it is preferable that the parts, especially the magnetic unit and the vacuum unit are utilized in combination. The current invention is particularly useful for drilling on metal workpieces, especially the housing of switchgear, which are often "live" and may be hazardous to work with. Here, for the purpose of providing a clear description, the surface of the workpiece that engages the drill bit is considered a "drilling surface," and the surface opposite to the drilling surface is defined as "inner surface." The location on the workpiece that engages the drill bit is the "drilling site." The terms "shavings" and "debris" generally refer to small pieces of metal or other materials generated by the drilling process. These terms are essentially synonyms and may also refer to "scraps," "fragments," "powders," and "crumbs" that are produced during drilling.

Before drilling starts, the magnetic unit is placed on the drilling surface, and around and/or adjacent to the drilling site. In a preferred embodiment, the magnetic unit has a ring or annulus shape, allowing it to surround the drilling site. The cover of the magnetic unit may comprise a unit base and a flippable top; the magnet core may be placed on the unit base; and the flippable top may be flipped up to allow the magnet core to be removed. During drilling, the metal shavings on the drilling surface are pulled towards the magnetic unit and attach to the cover, which is preferably non-magnetic and non-conductive. After drilling, the flippable top is flipped up, allowing the magnet core to be removed so that the metal shavings can no longer attach to the cover. The user may then easily discard the shavings. To ensure the physical robustness of the magnetic unit, a support structure may be included to provide physical support to the magnetic unit.

The vacuum unit is used to collect the shavings from the inner side. After initial penetration by the drill bit, shavings start to be generated at the inner surface. Such shavings are particularly dangerous because equipment such as switchgear may be damaged if the shavings fall into the equipment. The collecting cup of the vacuum unit may have a lower cup body and a cup rim, wherein the cup rim may fit on the inner surface. The cup covers the drilling site, providing a complete shielding and collecting structure that ensures all shavings from the inner surfaces are properly gathered.

The vacuum unit may further include a first connector, a second connector and a handle element having a handle tube and a handle, wherein the first connector, the second connector, and the handle tube are hollow inside, and the collecting cup, the first connector, the connecting tube, the second connector, and the handle tube are sequentially connected, forming a through channel. Furthermore, the vacuum unit may be connected to a vacuum motor providing suction power, allowing shavings on the inner surface to be collected. In one embodiment, the connecting tube is rigid, ensuring more toughness and robustness. In another embodiment, the connecting tube is flexible, allowing better adjustment. A user may take hold of the handle and manually press the collecting cup to the inner surface. Alternatively, the cup rim may include magnets so that the collecting cup can magnetically attach to the inner surface. The first connector and the second connector are structures that provide more flexibility to the design of the vacuum unit and these structures may have different length and twisting angles. By adjusting the first connector and the second connector, a user may reconfigure the vacuum unit to avoid pressing against the equipments in the workpiece.

The current invention may also include an improved hole saw drill set that includes a stopper flange. The conventional hole saw is a cylinder structure wherein the front end of the cylinder facing the workpiece has sawteeth that may cut through the workpiece to produce a hole. For the conventional hole saw drill set, there is no structure that stops the advancement of the hole saw against the workpiece even after the hole saw has completely passed the drilling surface. Such a design, however, puts performance above safety because while the hole saw can cut holes deeper than its entire length, over-penetration may result in damage to the equipment inside the inner surface by the drill bit. The conventional design is particularly dangerous when drilling on the housing of live switchgears. The current improved hole saw drill set includes a stopper flange attached to the hole saw arbor and positioned right behind and abutting the back end of the hole saw, blocking the advancement of the drill set when the hole saw cylinder has cut into the workpiece. Such a design prevents over-penetration and protects the inner structures of the workpiece.

In general, the present invention succeeds in conferring the following, and others not mentioned, desirable and useful benefits and objectives.

It is an object of the present invention to provide a drill safety system that is safe and easy to use.

It is another object of the present invention to provide a drill safety system having a magnetic unit capable of collecting metal shavings on the drilling surface.

It is another object of the present invention to provide a drill safety system having a magnetic unit with an openable cover that is non-magnetic and non-conductive.

It is another object of the present invention to provide a drill safety system having a magnetic unit that makes disposing the metal shavings easier.

Yet another object of the present invention is to provide a drill safety system having a vacuum unit that can collect the shavings on the inner surface.

Yet another object of the present invention is to provide a drill safety system having a vacuum unit that is easy to adjust and reconfigure.

Yet another object of the present invention is to provide a drill safety system that requires a minimum of maintenance.

It is another object of the present invention to provide a drill safety system that is robust and durable.

Yet another object of the present invention is to provide a drill safety system having an improved drill set with a stopper flange.

Yet another object of the present invention is to provide a drill safety system having an improved drill set with a stopper flange that prevents damages to the structures within the workpiece.

Still another object of the present invention is to provide a drill safety system that is inexpensive.

Still another object of the present invention is to provide drill safety systems having different parts that can be used individually and in combination with one another.

It is a further object of the invention to provide a drill safety system that is easy to manufacture.

DESCRIPTION OF THE PREFERRED EMBODIMENTS

The preferred embodiments of the present invention will now be described with reference to the drawings. Identical elements in the various figures are identified, as far as possible, with the same reference numerals. Reference will be made in detail to embodiments of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto without deviating from the innovative concepts of the invention.

Figure 1:
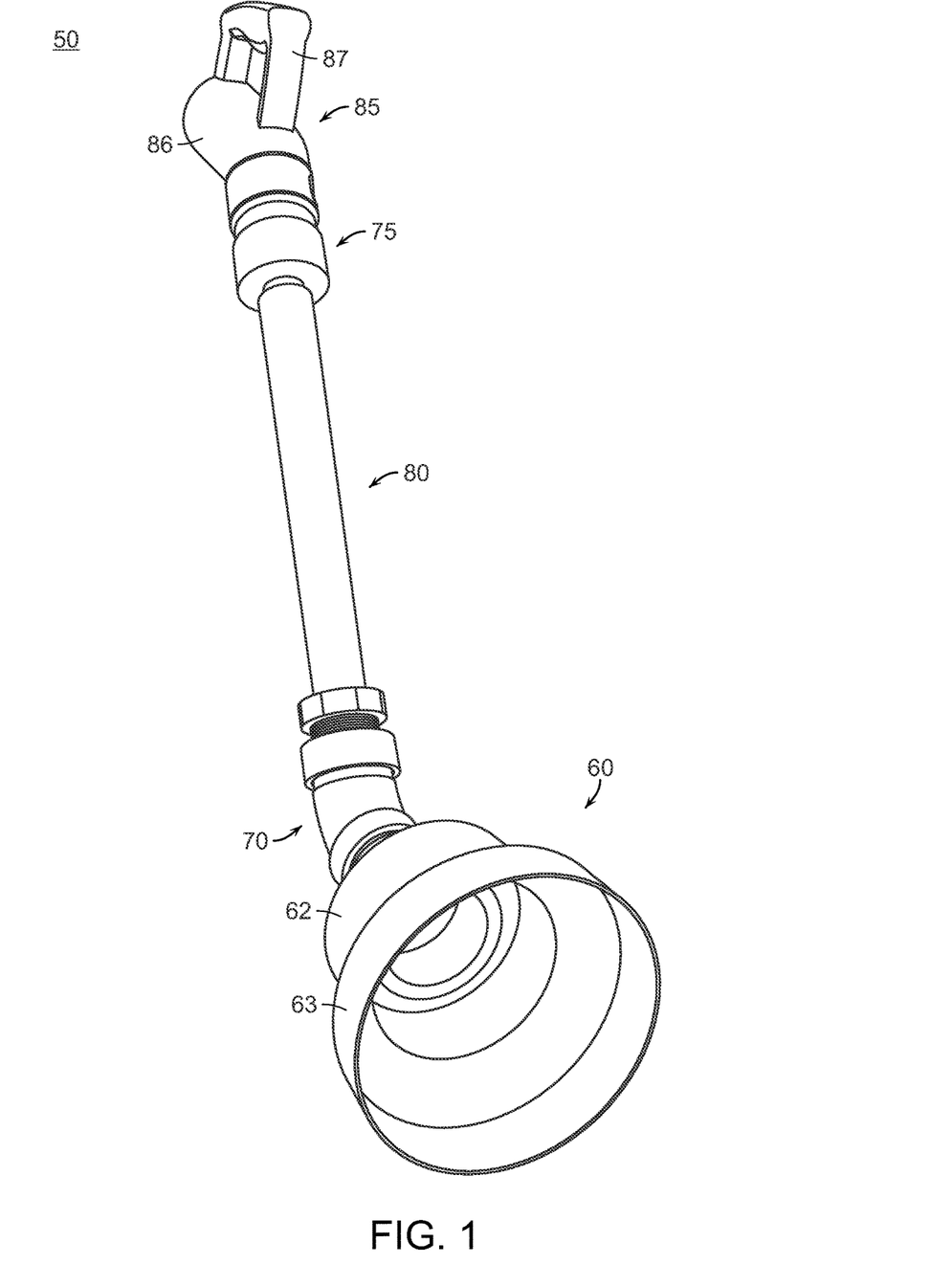
FIG. 1 shows a top perspective view of a vacuum unit of the drill safety system.

FIG. 1 shows a top perspective view of a vacuum unit of the drill safety system. Shown in FIG. 1 is the vacuum unit 50 having a collecting cup 60, a first connector 70, a second connector 75, a connecting tube 80, and a handle element 85, wherein the collection cup 60 has a lower cup body 62 and an enlarged cup rim 63, and the handle element 85 has a handle tube 86 and a handle 87. The collecting cup 60, the first connector 70, the connecting tube 80, the second connector 75 and the handle tube 86 are all hollow inside and are sequentially connected, forming a through channel for the movement and collection of drill shavings.

Figure 2:
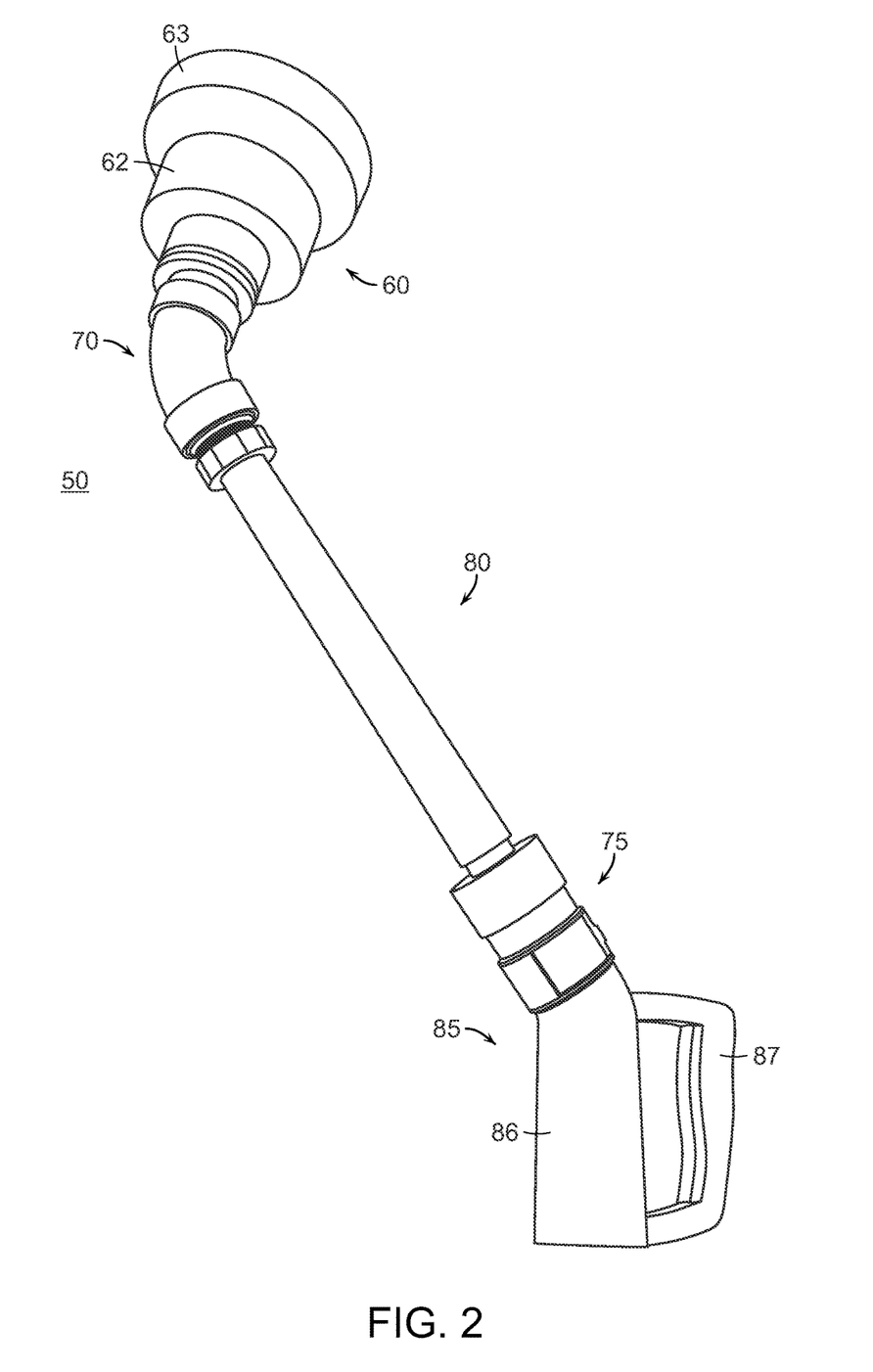
FIG. 2 shows a bottom perspective view of the vacuum unit of the drill safety system.

FIG. 2 shows a bottom perspective view of the vacuum unit of the drill safety system. Shown in FIG. 2 is the vacuum unit 50 having a collecting cup 60, a first connector 70, a second connector 75, a connecting tube 80, and a handle element 85, wherein the collection cup 60 has a lower cup body 62 and an enlarged cup rim 63, and the handle element 85 has a handle tube 86 and a handle 87. The collecting cup 60, the first connector 70, the connecting tube 80, the second connector 75 and the handle tube 86 are all hollow inside and are sequentially connected, forming a through channel for the movement and collection of drill shavings.

Figure 3:
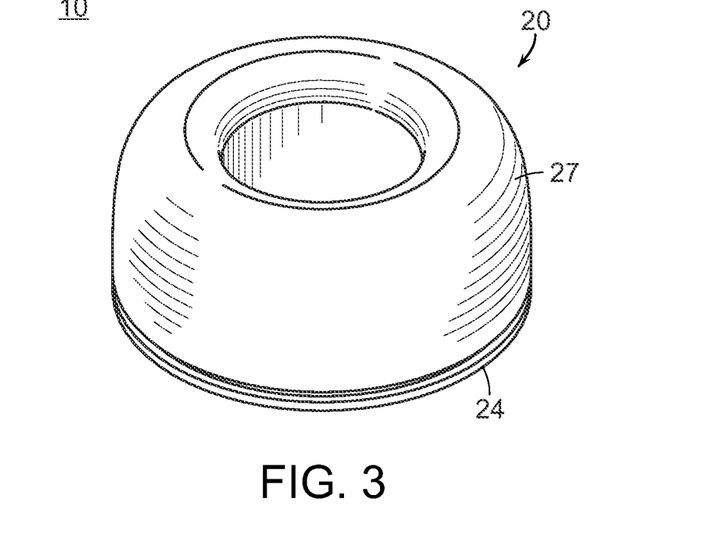
FIG. 3 shows a top perspective view of a magnetic unit of the drill safety system when the flippable top is set in place.

FIG. 3 shows a top perspective view of a magnetic unit of the drill safety system when the flippable top is set in place. Shown in FIG. 3 is the magnetic unit 10 having an outer cover 20, wherein the outer cover has a unit base 24 and a flippable top 27. The inner structures of the magnetic unit 10 are shielded from view. The magnetic unit 10 is generally a ring or annulus structure, especially if viewed from the top.

Figure 4:
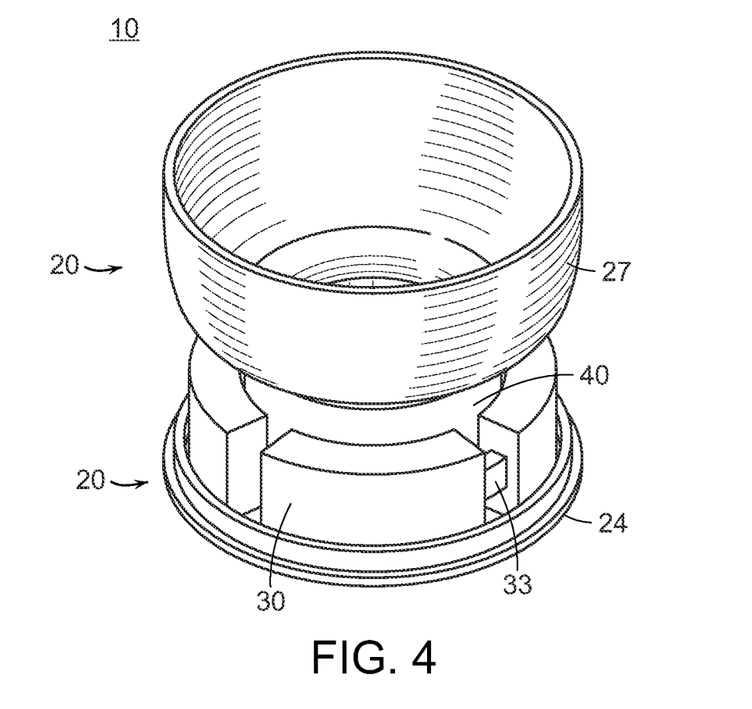
FIG. 4 shows a top perspective view of the magnetic unit of the drill safety system when the flippable top is flipped over.

FIG. 4 shows a top perspective view of the magnetic unit of the drill safety system when the flippable top is flipped over. Shown in FIG. 4 is the magnetic unit 10 having an outer cover 20, wherein the outer cover has a unit base 24 and a flippable top 27. The flippable top 27 is flipped up, showing the inner magnets 30, the magnet connectors 33, and the support ring 40. As indicated by FIG. 3, the magnets 30 are fully covered when the flippable top 27 is flipped down. As shown in FIG. 4, the magnets 30 are placed around the support ring 40 and on the unit base 24.

Figure 5:
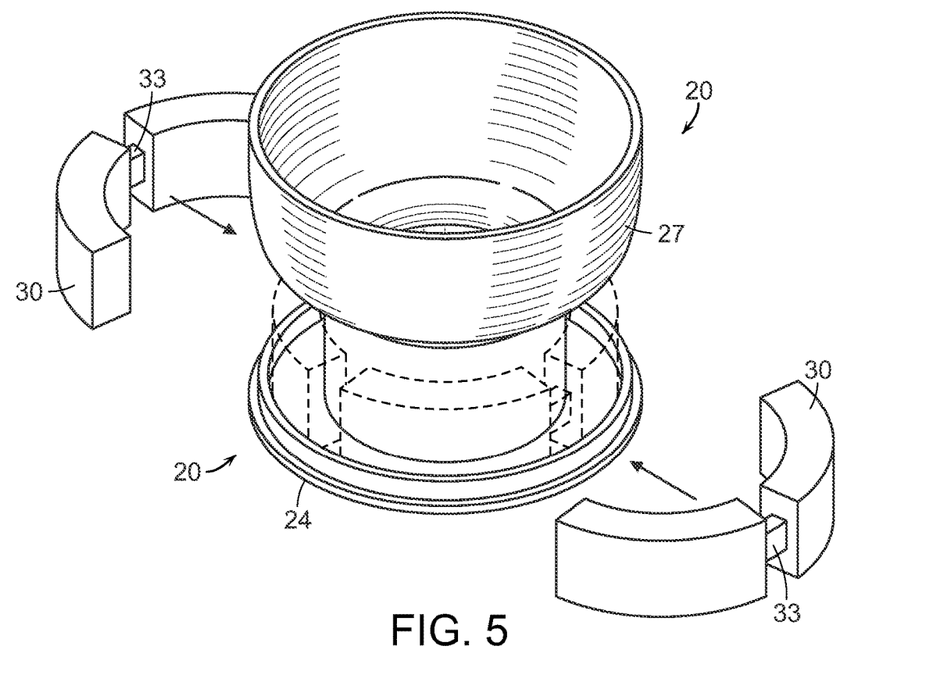
FIG. 5 shows a top perspective view of the magnetic unit of the drill safety system when the flippable top is flipped over and the magnets are removed.

FIG. 5 shows a top perspective view of the magnetic unit of the drill safety system when the flippable top is flipped over and the magnets are removed. Shown in FIG. 5 is the magnetic unit 10 having an outer cover 20, wherein the outer cover has a unit base 24 and a flippable top 27. The flippable top 27 is flipped up, showing the inner magnets 30, the magnet connectors 33, and the support ring 40. The magnets 30 are removed from the unit base 24.

Figure 6:
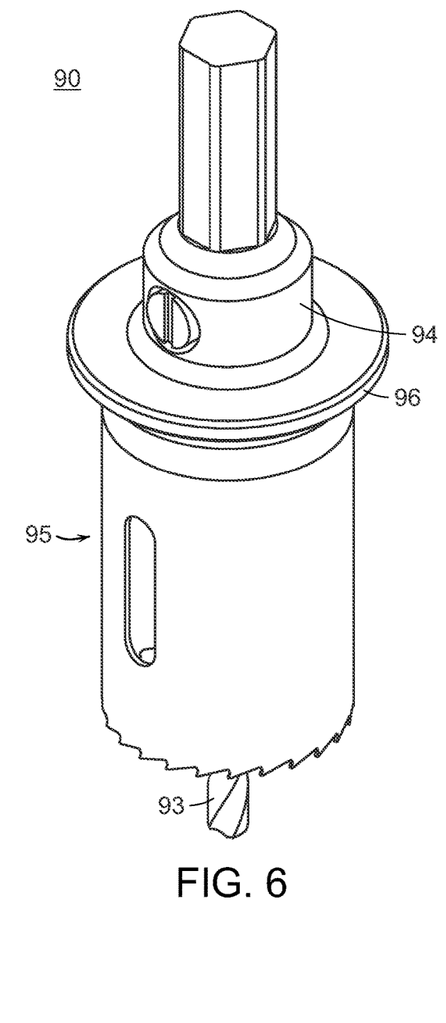
FIG. 6 shows a top perspective view of an improved drill set of the drill safety system.

FIG. 6 shows a top perspective view of an improved drill set of the drill safety system. Shown in FIG. 6 is the drill set 90 having a pilot bit 93, a hole saw arbor 94, and a hole saw 95. The key feature for this embodiment is that the hole saw arbor 94 includes a stopper flange 96 positioned right behind and abutting the hole saw 95.

Figure 7:
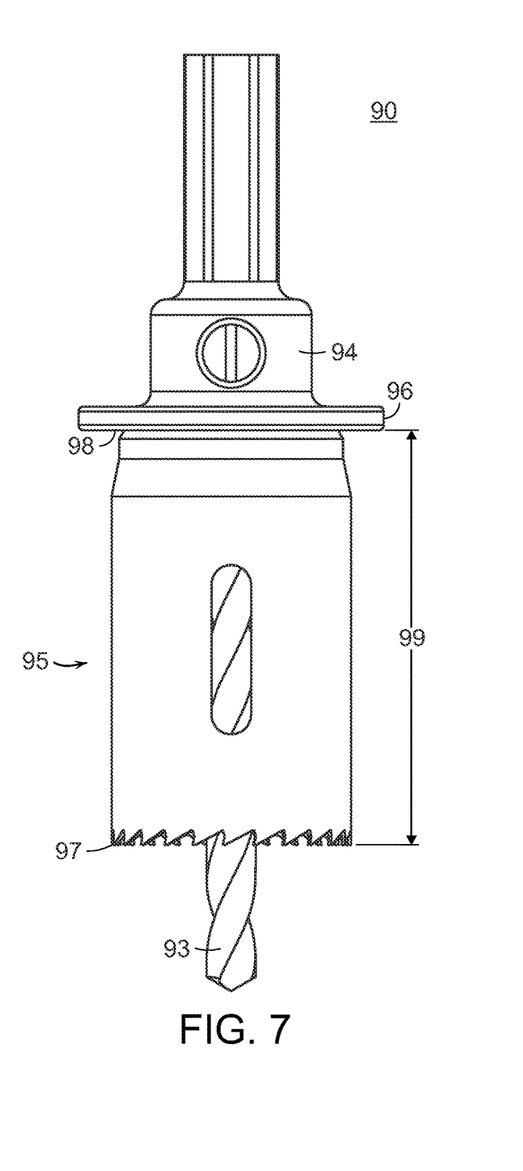
FIG. 7 shows a side view of the improved hole saw drill set of the drill safety system.

FIG. 7 shows a side view of the improved drill set of the drill safety system. Shown in FIG. 7 is the drill set 90 having a pilot bit 93, a hole saw arbor 94, and a hole saw 95. The key feature for this embodiment is that the hole saw arbor 94 includes a stopper flange 96 positioned right behind and abutting a back end 98 of the hole saw 95, defining a hole saw length 99 measured from a front end 97 to the back end 98 of the hole saw 95. Such an improvement limits the depth of the hole resulted from drilling with the drill set 90 to the hole saw length 99, preventing unintended over-drilling that may damage the equipment underneath the drilling site.

Figure 8:
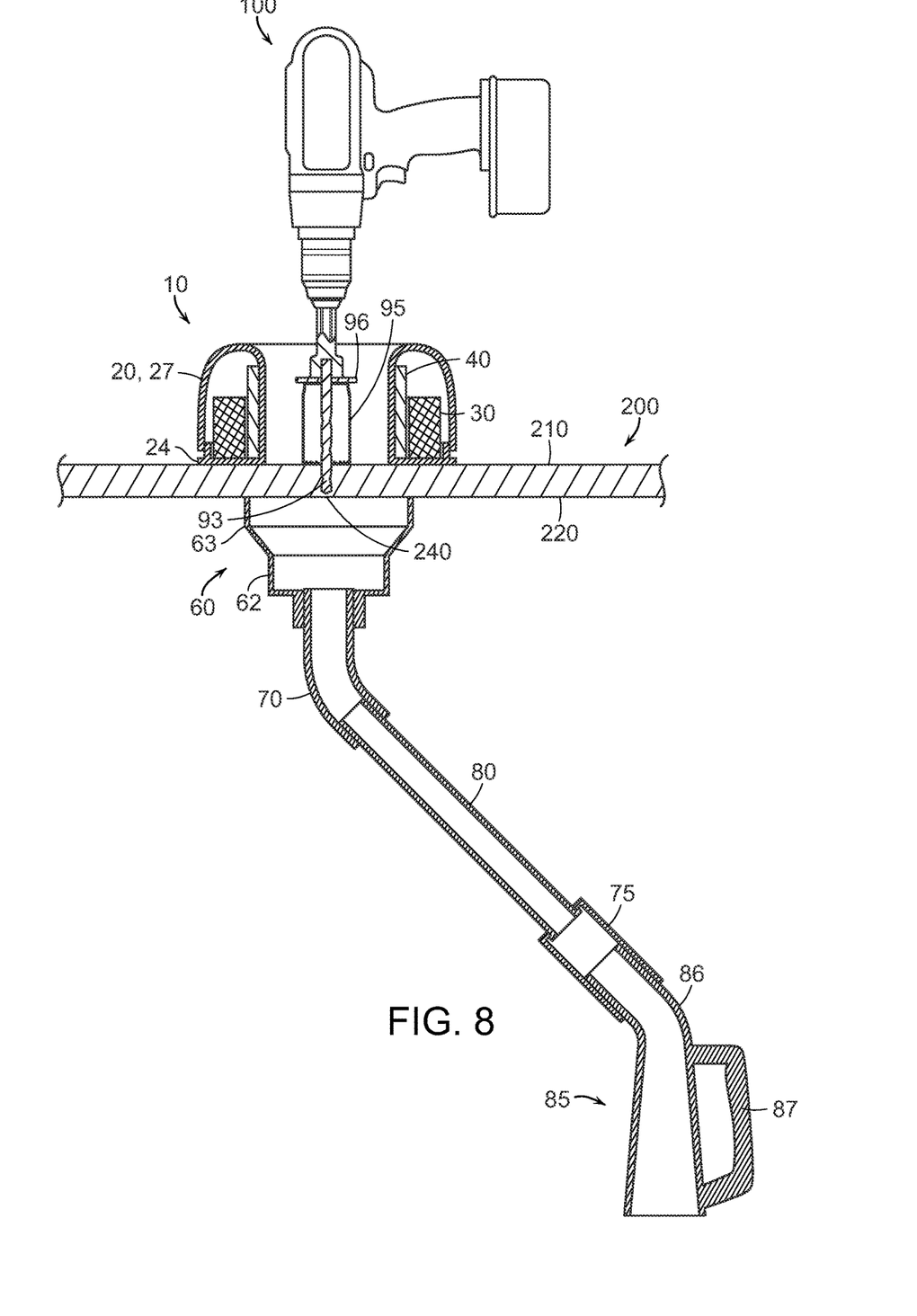
FIG. 8 shows a side sectional view of all components of the drill safety system when the system is in use.

FIG. 8 shows a side sectional view of all components of the drill safety system when the system is in use. Shown in FIG. 8 is a drill 100 equipped with the improved drill set 90 having a pilot bit 93 and a hole saw 95, which includes bit stopper flange 96. Also shown in FIG. 8 are the magnetic unit 10 and the vacuum unit 50, wherein the magnetic unit 10 comprises an outer cover 20 having a unit base 24 and a flippable top 27, inner magnets 30 with magnet connectors 33, and a support ring 40; the vacuum unit 50 comprises a collecting cup 60, a first connector 70, a second connector 75, a connecting tube 80, and a handle element 85; and the collection cup 60 has a lower cup body 62 and an enlarged cup rim 63, and the handle element 85 has a handle tube 86 and a handle 87. As shown in FIG. 8, the collecting cup 60, the first connector 70, the connecting tube 80, the second connector 75 and the handle tube 86 are all hollow inside and are sequentially connected, forming a through channel for the movement and collection of drill shavings.

In FIG. 8, drilling is being conducted on a metal board 200, which has a drilling surface 210 that engages the pilot bit 93 and the hole saw 95, as well as an inner surface 220 that is the opposite of the drilling surface 210. In addition, the location on the board 200 that initially engages the drill bits are generally termed a drill site 240. The board 200 is intended as an example for the workpieces on which drilling can be conducted. Workpieces having different shapes, sizes, depth, thickness, and texture are all possible.

Referring to FIGS. 1, 2, and 8, the drill safety system may include a vacuum unit 50. As indicated above, the vacuum unit 50 is used to collect the shavings from the inner side 220. The collecting cup 60 of the vacuum unit 50 has a lower cup body 62 and an enlarged cup rim 63, wherein the cup rim 63 may fit on the inner surface 220. The collecting cup 60 covers the drilling site 240, providing a complete shielding and collecting structure that ensures all metal and non-metal shavings on the inner surfaces are properly gathered. Although the collecting cup 60 has a round opening, it should be noted that other shapes, such as square, may also be adopted. In a preferred embodiment, the inner surface 240 is a flat surface and the cup rim 63 may fit on the flat surface.

The collecting cup 60 and the connecting tube 80 are the essential elements of the vacuum unit 50, which can be connected to a vacuum motor providing suction power, allowing shavings on the inner surface to be collected. The connecting tube 80 may be rigid or flexible. In addition, as indicated by FIGS. 1 and 2, the vacuum unit 50 may further include a first connector 70, a second connector 75, and a handle element 85, which may include a handle tube 86 and a handle 87, wherein the collecting cup 60, the first connector 70, the connecting tube 80, the second connector 75, and the handle tube 86 all hollow inside and are sequentially connected, forming a through channel.

Preferably, a user may take hold of the handle 87 and manually press the collecting cup 60 to the inner surface 240. Such an embodiment does not require the worker to reach inside the housing of live switchgear and improves safety. Alternatively, the cup rim 63 may include magnets so that the collecting cup 60 can magnetically attach to the inner surface 240, allowing the person conducting the drilling to do the work alone. The first connector 70 and the second connector 75 are structures that provide more flexibility to the design of the vacuum unit 50 and these structures may have different length and twisting angles. By adjusting the first connector 70 and the second connector 75, as well as the connecting tube 80 and the handle element 85, a user may reconfigure the vacuum unit 50 to avoid pressing the various parts of the vacuum unit 50 against the equipment in the workpiece. Various methods can be used to connect the collecting cup 60, the first connector 70, the connecting tube 80, the second connector 75, and the handle element 85. These structures can be screwed, molded, welded, or glued together, or using any combination of suitable methods.

Referring to FIGS. 3, 4, 5, and 8, the magnetic unit 10 is used to collect the metal shavings on the drilling surface 210. Before drilling, the magnetic unit 10 is placed on the drilling surface 210, and around and/or adjacent to the drilling site 240. Since the magnetic unit 10 includes magnets 30, when the workpiece is metal, the magnetic unit 10 may securely attach to the workpiece without the aid of gravity. This feature is particularly useful when the drilling surface is not horizontal. In a preferred embodiment as shown in FIGS. 3-5, the magnetic unit has a ring or annulus shape, especially if viewing from the top. The ring shape allows the magnetic unit 10 to surround the drilling site 240, as shown in FIG. 8. However, it should be noted that the shape of the magnetic unit 10 may vary according to the specific job to be conducted, the size and shape of the work piece, and surface conditions. For example, the magnetic unit 10 may be an elongated strip that may be flexed and twisted to conform to a specific drilling work. The strip-shaped magnetic unit 10 may even be twisted in a circle to mimic the ring-shape embodiment.

The cover 20 of the magnetic unit may comprise a unit base 24 and a flippable top 27, wherein the magnet core—the magnets 30 combined with the connector 33—may be placed on the unit base 24 and be shielded by the flippable top 27 when the flipped top 27 is flipped down. It is possible that the unit base 24 and the flippable top 27 form a single continuous structure. Alternatively, the unit base 24 and the flippable top 27 may be distinct but attached structures that as a whole form a cover 20 shielding the a magnet core. It should also be noted that while the embodiment shown in FIGS. 3-5 show the flippable top 27 to expose the inner structures of the magnetic unit 10 by flipping up, other designs are still possible. The key feature for the cover 20 is that it may be opened so that the magnets may be removed. Specific designs may vary and as long as the general structures fit with the essential concept, such designs are incorporated in the current invention.

When the flippable top 27 is flipped down, no magnet is directly exposed. The metal shavings resulted from drilling on the drilling surface are pulled towards the magnetic unit 10 and attached to the cover 20, which is preferably non-magnetic and non-conductive. After drilling, as shown in FIGS. 4-5, the flippable top 27 is flipped up, allowing the magnets 30 to be removed so that the metal shavings can no longer attach to the cover 20. The user may then easily discard the shavings, put the magnets 30 back, flip down the flippable top 27, and make the magnetic unit 10 ready to be used again.

To ensure the physical robustness of the magnetic unit 10, a support structure 40 may be included to provide physical support to the magnetic unit 10. The support structure 40 is preferred to be rigid and it may conform to the shape of the magnetic unit 10. As indicated above, the shape of the magnetic unit 10 may vary. Therefore, the size and shape of the support structure 40 may vary accordingly.

The magnets 30 used in the current invention are preferably permanent magnets and may be any type of magnetic material, including but not limited to: metallic magnets, composite magnets, and rare earth magnets, and any combination thereof. The magnet connectors 33 are optional elements used to link two or more magnet pieces together, allowing easier placement and removal. A magnet 30 may have a wrap that covers the magnet 30, wherein the wrap may directly link with the magnet connector 33. It is preferred that the magnet connector 33 is flexible, allowing the magnet pieces to bend against one another. The embodiment shown in FIG. 5 includes two magnets sets, each including two magnet pieces linked by a magnet connector 33. It should be clear that such format may vary according to the size of the magnetic unit 10, the magnetic power required, and the specific needs of the drilling work.

Referring to FIGS. 6, 7, and 8, the drill safety system may include an improved hole saw drill set 90 that includes a stopper flange 96. As indicated above, similar to the conventional hole saw drill bit, the current hole saw 95 is a cylinder structure that can be connected, usually with a threaded section, to a drill arbor 94, wherein the front end 97 of the cylinder facing the board 200 has sawteeth that may cut through the board 200 to produce a hole at drilling site 240. In the current improved hole saw drill set 90, the hole saw arbor 94 includes a stopper flange 96 extending from a periphery of the hole saw arbor 94 and positioned right behind and abutting the back end 98 of the hole saw 95, blocking the advancement of the hole saw 95 when the entire cylinder of the hole saw 95 has cut into the workpiece.

The length 99 of the hole saw 95, measured from the front end 97 to the back end 98, sets a maximum limit for the depth of the hole. To cut a through hole on the board 200, the thickness of the board 200 must be smaller than the length 99 of the hole saw 95. Such a design prevents over-penetration, protects the inner structures of the workpiece, and in essence puts more emphasis on the safety of the device. It is a better design compared with placing the stopper flange directly on the back end 98 of the hole saw 95 because the current design allows hole saws with different lengths to be used with the same drill arbor 94. The user may choose drill bits having different lengths for different projects and use the same drill arbor, ensuring that the drilling can be conducted effectively and protection is provided at the same time.

As indicated above, the various parts of the drill safety device may be used individually and in combination with one another. For example, the user may utilize a conventional hole saw drill bit for drilling that is protected by the magnetic unit 10 and the vacuum unit 50. The magnetic unit 10 may be used together with traditional make-shift arrangement used by electricians or the device disclosed in U.S. Pat. No. 6,974,048. The magnetic unit 10 and the vacuum unit 50, when used together, provide a complete solution for debris removal when drilling on metallic workpieces. The inclusion of the improve hole saw drill bit further adds to the level of security that prevents damages and accidents.

In terms of dimension, the sizes of various parts of the drill safety system may vary according to drill beings used, the intended drilling results, and the size and the shape of the workpiece. The collecting cup 60 is preferred to provide sufficient coverage of the drilling site 240. The covered area of the collecting cup 60, measure by the area within the cup rim 63, is preferred to range from 1 cm$^2$ to 1 m$^2$, with the more preferred range of 10 to 200 cm$^2$. The overall length of the vacuum unit 50 may range from 10 cm to 5 m, with the preferred range of 30 to 100 cm. When the magnetic unit 10 has a ring shape, as indicated in FIGS. 3-5, the inner diameter may range from 1 cm to 1 m, with the preferred range of 5 to 30 cm, the outer diameter may range from 1 cm to 1.5 m, with the preferred range of 5 to 50 cm, and the ration of (outer diameter)/(inner diameter) may range from 1.1 to 5, with the preferred range of 1.2 to 2.5. The length 99 of the hole saw 95 may range from 0.5 to 100 cm, with the preferred range of 1 to 20 cm.

It is preferred that various parts of the drill safety system are not too heavy so that they may be held, transported, and used with easy. In particular, the vacuum unit 50 is preferred to be light because in some cases, a user is supposed to hold the vacuum unit 50 during drilling. The overall weight of the vacuum unit 50 may range from 10 g to 20 kg, with the preferred range of 100 g to 5 kg. The overall weight of the magnetic unit 10 may range from 50 g to 20 kg, with the preferred range of 200 g to 10 kg. The overall weight of the drill set 90 may range from 10 g to 5 kg, with the preferred range of 20 g to 2 kg.

In terms of materials, any part of the vacuum unit 50 and the magnetic unit 10 that make contact with the workpiece is preferred to be non-conductive and non-magnetic. The various parts of the vacuum unit 50 may be made from the same or different materials. The material is preferred to be safe, strong, and impermeable to liquid. Moreover, it would be desirable that the material is inexpensive and easy to process during manufacture. The materials that may be used include but are not limited to: rubber, and plastic such as, but not limited to, polyethylene terephthalate (PET), polyethylene (PE), high-density polyethylene, polyvinyl chloride (PVC), polyvinylidene chloride (PVDC), low-density polyethylene (LDPE), polypropylene (PP), polystyrene (PS), high impact polystyrene (HIPS) and polycarbonate (PC), or paperboard coated with a suitable coating such as, but not limited to, polyethylene, or some combination thereof. The various parts of the magnetic unit 10 may be made from the same or different materials. The magnets 30, as indicated above, are preferred to be permanent magnets. The cover 20 of the magnetic unit 10 is preferred to be non-conductive, non-magnetic, flexible but durable so that the flippable top 27 may be flipped up and down numerous times. The materials suitable to make the cover 20 include but are not limited to rubber, and plastic such as, but not limited to, polyethylene terephthalate (PET), polyethylene (PE), polyvinylidene chloride (PVDC), low-density polyethylene (LDPE), polypropylene (PP), polystyrene (PS), high impact polystyrene (HIPS) and polycarbonate (PC), or paper or fabric coated with a suitable coating such as, but not limited to, polyethylene, or some combination thereof. The preferred material for the cover 20 of the magnetic unit 10 is rubber.

As indicated above, the primary focus of the current invention is to improve safety during the drilling of live equipment. However, the use of the current invention is much broader. For example, with proper arrangement, the vacuum unit, the magnetic unit, and the improved hole saw will also help to save time in new installations. When the workers are doing new installations of switch gear, holes are drilled into the housing. The conventional approach is to use some make-shift arrangement or vacuum out the equipment after drilling has been completed. In systems like data centers each piece of gear may have 8-16 conduits and a significant amount of shavings may be left on top of the gear. The electricians usually need to spend several days vacuuming out all of the gear before it can be energized for the first time. Using the current invention significantly lessens the time and man-power to clean the new gear before energizing it for the first time because the debris is collected while holes are being drilled.

In addition, the current invention may be used to install new circuits underneath raised computer floors sites such as data centers, which have very strict rules about debris caused by new installations in such critical environments. Air conditioning usually moves underneath the floor, creating a strong flow of air that may spread the shavings. This is a situation where the worker is either drilling from underneath equipment and debris would be falling into the clean computer floor or drilling into a junction box that is under the raised floor where the air flow is moving and blowing everything around. The conventional approach is to have a worker hold a shop vacuum nozzle next to the drill site while another worker drills. Then, the floors are vacuumed and coated after a new install before a company moves in. The conventional method gets most of the debris but usually misses whatever is on the side of the drill opposite the vacuum nozzle. Using the current invention properly collects all the shavings while drilling is being conducted, saving a significant amount of time and cost.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A drill safety system for removing drill debris, comprising: a circular magnetic unit having a central aperture extending from a top to a bottom of the circular magnetic unit and configured to provide access to a drilling surface when the circular magnetic unit is positioned on the drilling surface, the circular magnetic unit comprising, a magnet core having at least two semi-circular magnetic sections, wherein each of the at least two semi-circular magnetic sections comprise at least two magnets directly affixed to one another with a magnet connector, and a cover shielding the magnetic core coupled to a support ring, wherein the cover has a circular top and bottom and comprises a circular unit base and a flippable top, the flippable top having a first functional position and a second functional position, wherein the first functional position orients the flippable top in a direction opposite to the circular unit base to expose and provide unobstructed access to the at least two semi-circular magnetic sections, and wherein the second functional position orients the flippable top towards the circular unit base to fully cover the at least two semi-circular magnetic sections; and a vacuum unit configured to be positioned on a surface opposite the drilling surface, the vacuum unit comprising, a collecting cup having a lower cup body, an upper cup body, and a cup rim, wherein the upper cup body has a diameter greater than that of the lower cup body, a connecting tube, a first connector and a second connector, wherein the collecting cup and the connecting tube are coupled via the first connector; and wherein the vacuum unit is configured to operably connect to a vacuum motor.

2. The drill safety system of claim 1, wherein when the flippable top is in the second functional position, the magnet core is configured to be removed from the circular magnetic unit.

3. The drill safety system of claim 1, wherein the at least two semi-circular magnetic sections are semi-circular in shape.

4. The drill safety system of claim 1, wherein the magnet core is positioned on the circular unit base and covered by the flippable top.

5. The drill safety system of claim 1, wherein the support ring is shielded by the cover.

6. The drill safety system of claim 1, wherein the cup rim is configured to fit on a flat surface.

7. The drill safety system of claim 1, wherein the first connector and the second connector are hollow, and the collecting cup, the first connector, the connecting tube, and the second connector are sequentially connected.

8. The drill safety system of claim 1, wherein the connecting tube is flexible.

9. A drill safety system, comprising: a circular magnetic unit having a central aperture extending from a top to a bottom of the circular magnetic unit and configured to provide access to a drilling surface when the circular magnetic unit is positioned on the drilling surface, the circular magnetic unit comprising, a magnet core having two semi-circular magnetic sections, wherein each of the two semi-circular magnetic sections comprises two magnets directly affixed to one another with a magnet connector, a flexible cover having a circular top and bottom and comprising a circular unit base and a flippable top, the flexible cover shielding the magnetic core, wherein the flippable top has a first functional position and a second functional position, wherein the first functional position orients the flippable top in a direction opposite to the circular unit base to expose and provide unobstructed access to the two semi-circular magnetic sections, and wherein the second functional position orients the flippable top towards the circular unit base to fully cover the two semi-circular magnetic sections; a vacuum unit configured to be positioned on a surface opposite the drilling surface and operably connect to a vacuum motor, the vacuum unit comprising, a collecting cup, wherein the collecting cup has a lower cup body, an upper cup body, and a cup rim, wherein the upper cup body has a diameter greater than that of the lower cup body, a connecting tube, wherein the collecting cup and the connecting tube are hollow and are connected, and a handle element coupled to the connecting tube; and a hole saw drill set comprising, a drill arbor and hole saw attached to the drill arbor, the drill arbor having a stopper flange extending from a periphery of the drill arbor.

10. The drill safety system of claim 9, wherein the two semi-circular magnetic sections form a ring shape when positioned on the circular unit base.

11. The drill safety system of claim 9, wherein the vacuum unit further comprises a first connector and a second connector, wherein the first connector and the second connector are hollow, and the collecting cup, the first connector, the connecting tube, and the second connector are sequentially connected, forming a through channel.

12. The drill safety system of claim 9, wherein the circular magnetic unit further comprises a support ring shielded by the cover, the support ring providing physical support to the circular magnetic unit.

13. The drill safety system of claim 12, wherein the magnet connector, allows the two magnets to flex against each other.

14. The drill safety system of claim 9, wherein the stopper flange is positioned behind and abutting a back end of a hole saw drill bit.

15. The drill safety system of claim 14, wherein the stopper flange blocks advancement of the hole saw by holding against a workpiece.

* * * * *